(No Model.)
H. O. THOMAS.
HAND TRUCK.
No. 571,705.  Patented Nov. 17, 1896.
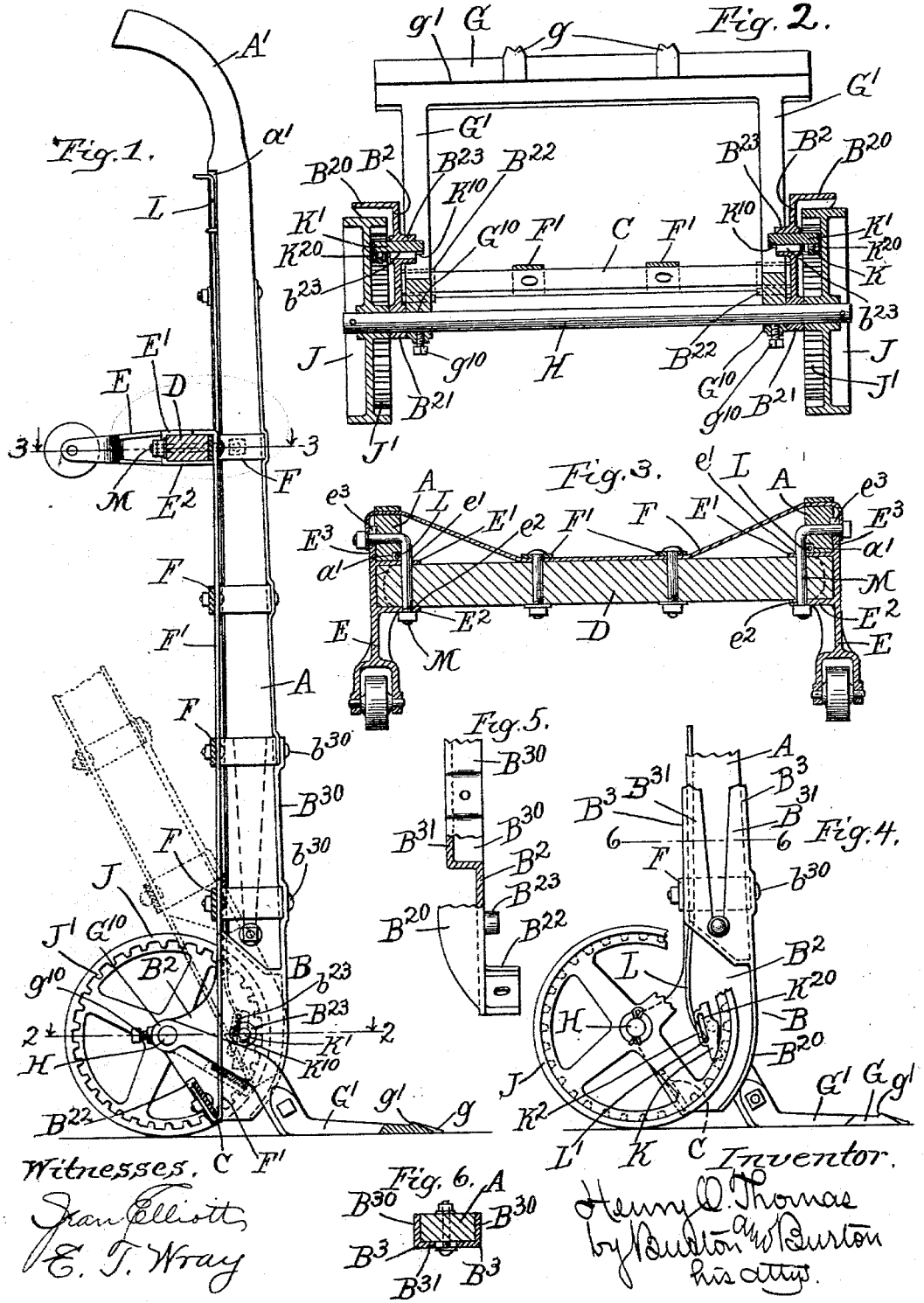

UNITED STATES PATENT OFFICE.

HENRY O. THOMAS, OF CHICAGO, ILLINOIS.

HAND-TRUCK.

SPECIFICATION forming part of Letters Patent No. 571,705, dated November 17, 1896.

Application filed November 16, 1895. Serial No. 569,155. (No model.)

*To all whom it may concern:*

Be it known that I, HENRY O. THOMAS, a citizen of the United States, residing at Chicago, county of Cook, and State of Illinois, have invented certain new and useful Improvements in Hand-Trucks, which are fully set forth in the following specification, reference being had to the accompanying drawings, forming a part thereof.

In the drawings, Figure 1 is a vertical section fore and aft through the middle of a truck having my improvements, showing the truck in upright position in full line and partly broken away in dotted line in inclined position. Fig. 2 is a section at the line 2 2 on Fig. 1. Fig. 3 is a section at the line 3 3 on Fig. 1. Fig. 4 is a detail outer side elevation of the lower portion of the side of the frame not shown in Fig. 1, the wheel being partly broken away to show the dog which engages the wheel. Fig. 5 is a detail edge view of one of the brackets which terminate the side bars, one web being broken partly away. Fig. 6 is a section at the line 6 6 on Fig. 4.

My improved truck comprises the rigid body or frame which is to carry the load, the two wheels on which the truck runs, and the shoe or lift at the lower or forward end designed for picking up the load and retaining it on the truck, such shoe or lift being pivotally connected to the body and having a range of motion about its pivot between two limits, the rear limit being such that at that limit the body of the truck stands upright with the shoe and wheels on the floor, whereby the truck is rendered stable in upright position without requiring a support to lean against and without danger of being easily thrown over. The forward limit is such that while the nose or forward edge of the shoe or lip is on the floor adapted to engage under the load the body is inclined rearward at a convenient angle to afford good leverage to the operator in prying up the load.

The body comprises the side bars A A, terminating in handles A' A', having each at their forward or lower ends brackets B B, provided with the axle-bearings and pivotal connections and stops for the shoe or lift. The body or lift further consists of a cross-sill C at the lower forward end, a cross-sill D toward the rear or upper end, said cross-sill having the legs E E joined with it to the side bars, as hereinafter more specifically explained, and any desired number of additional cross-straps F F F, &c., intermediate the front and rear cross-sills, and longitudinal staying bars or straps F' F' crossing and joined to all the cross-sills and straps.

The shoe or lift comprises the forward lip G and lever-arms G' G', projecting rearwardly from the lip and adapted to be pivoted at their rear ends to the truck-body. I prefer to make the axle H constitute the fourth side of a quadrangular frame, the other three sides of which are made up of the lip G and arms G' G' above described, and I therefore terminate said arms at the rear in eyes $G^{10}$ $G^{10}$, through which the axle H extends, being made fast in the eyes by set-screws $g^{10}$ $g^{10}$. The arms G' G' of the shoe extend in between the side brackets B B, above or sideward of the cross-sill C, which thus stops the shoe at the forward or lower limit. At its upper or rear limit the shoe is stopped by bosses $B^{23}$ $B^{23}$, which project inward from the inner faces of the brackets B B, respectively. Said bosses serve also another purpose hereinafter explained.

Each of the brackets B, which terminate the side bars A respectively, is formed with rectangular sockets to receive the side bars, and a web $B^2$, which forms a guard at the inner side of the wheel J, from which a peripheral guard-flange $B^{20}$ projects outwardly over the wheel. The web $B^2$ has a boss $B^{21}$, in which the axle H is journaled, and which thereby becomes the pivot-bearing for the quadrangular frame which comprises the axle and the shoe, as above described.

The sockets for the handle-bars consist of two angular prongs or fingers $B^3$ $B^3$, developed upwardly from the guard-flange $B^2$, one web, $B^{31}$, of each of said angle-fingers being in the plane of the outer surface of the bar, and the other web, $B^{30}$, projecting inwardly therefrom and adapted to seat on the upper and lower or front and rear edges of the side bar. Bolts $b^{30}$, passed through said edge webs $B^{30}$ and through the side bars, clamp the latter within the socket formed by said angular fingers $B^3$ $B^3$, which are adapted to be drawn together by the bolts, the metal yielding sufficiently for the purpose in order to clasp the side bars firmly. From the lower side of the web $B^2$ a lug $B^{22}$ projects inwardly, and the lower cross-sill C is seated on and bolted to said lug. The wheels J J have interior ratchet-rims J' J', whereby they are adapted to be locked to the brackets by a dog K. This dog has a stem K' projecting transversely and obtaining pivot-bearing at the boss $B^{23}$ in the web $B^2$ of the bracket B. In order to be easily inserted and yet securely retained, the stem K' of the dog has a spur $K^{10}$, and the aperture through the boss $B^{23}$, in which the stem of the dog obtains its bearing, has a notch $b^{23}$, through which the spur $K^{10}$ passes when the stem of the dog is inserted through the boss. The spur, being at the end of the stem, passes entirely through the boss and stands beyond it at the inner side when the dog is against the outer face of the web $B^2$ $B^2$, and when the dog is turned from its working position with respect to the ratchet-rim of the wheel the said spur is carried away from the notch, and the dog is thereby retained in the bracket and cannot be dislodged so long as the wheel is in place, because to dislodge it it will be necessary to rotate the dog past said rim. The dog has a web or rib $K^2$, provided with the long slot $K^{20}$, which extends past the axis of the stem K'.

L is a rod which is lodged in a rabbet $a'$ alongside the handle-bar at the lower inner corner, and extends beyond the lower end of the side bar along the outer face of the web $B^2$, and at the lower end is bent at right angles, forming a finger L', which enters the slot $K^{20}$ of the dog K. When the rod L is pushed to the lower end of the slot, it rocks the dog to position for engaging the ratchet-rim of the wheel, and being flexed over the lower corner of the side bar by the crowding inward of its end, as the latter follows the slot $K^{20}$ of the dog, the rod serves as a spring to hold it in engagement, and when it is pulled up to the upper end of the slot it rocks the dog out of engagement and holds it out. The lip G of the shoe has two teeth $g$ $g$ projecting from its forward edge, symmetrically situated with respect to the middle point of the length of the lip, said teeth being themselves preferably serrated or notched. These teeth serve two purposes—first, that when the truck is used to pick up the end of any heavy and round object, such as a piece of heavy iron pipe, such object being engaged by the lip between the two teeth, and the truck being tilted to lift it, the teeth prevent it from rolling off, as it would be liable to do if the edge of the lip were straight and uninterrupted by projections. Another purpose served by these teeth is that the truck may be used to pick up a box without inserting the lip under the edge of the box, but merely advancing the truck against the box and tipping it against the teeth $g$, the dog K being in engagement with the wheels, preventing them from rotating in a direction to permit the truck to slide back from the box. The weight of the box on the teeth $g$ causes them to become embedded in the box, so that the latter may be tipped over onto the truck without danger of slipping on the lip, and may be loaded as effectively as it had been engaged by slipping the lip under it. Another feature of this lip is important—viz., the shoulder $g'$, which extends from end to end of the lip back of its edge, the lip sloping up from its forward edge, which is preferably quite acute, to the shoulder, and then slipping up again from the boss of the shoulder to the rear edge. The purpose of this shoulder is to prevent a box or other straight-edged load which may have been picked up by inserting the shoe under it from slipping off the lip, as it would be liable to do when it is tilted back onto the truck. When the lip has the shoulder, the edge of the box or other load, being upon the lip back of that shoulder before the load is tipped back onto the truck, is prevented from slipping forward of the lip by engagement with the shoulder.

The structure of the legs E E and their connection with the cross-sills and side bars A is a feature of some importance and will now be described. The leg is formed with a lateral socket for the end of the cross-sill D, such socket being defined by the horizontal lugs E' $E^2$, and with a seat for the side bar A, defined by the horizontal lug E' and the vertical lug $E^3$. The lug $E^3$ has the notch or slot $e^3$ in its upper end, and is thickened from the bottom of the notch upwardly to the end, as seen in Fig. 3.

M is an angle bolt or clamp adapted to have one arm passed through the holes $e'$ $e^2$ in the lugs E' $E^2$, while the other arm is lodged in the notch $e^3$ at the upper end of the vertical lug $E^3$, both ends of the angle-bolt being threaded and adapted to receive clamping-nuts. To secure these legs to the side bars, they are placed on the opposite ends of the sill D, which is entered in the sockets provided for it on the legs. The bolts M having had one arm inserted from the inner side through the bolt-holes in the side bar, the other arms hanging down, the sill, with the two legs upon it, is brought in position by entering the downwardly-hanging ends of the bolts in the proper bolt-holes through the lugs E' $E^2$ and through the ends of the sill lodged between said lugs, and the entire structure, comprising the sill D and the two legs, is driven up to position, the lugs $E^3$ passing up outside the side bars and their notches striding the outwardly-projecting ends of the bolts M. The legs having been forced up until the side bars are snugly seated in the angle-seats defined by the lugs E' and $E^3$, nuts are applied to both ends of the angle-bolts and they are drawn tight against the lugs $E^2$ and $E^3$, respectively. The thickening of the lugs $E^3$, as described, toward the ends makes the outer face on which the nuts, or suitable washers interposed under them, seat oblique to the face of the nuts or washers, the inner face of the lug being at right angles to the face of the horizontal lug which forms the other side of the angular seat for the side bar. The clamping of the nuts therefore tends to bend inward the upper ends of the lugs $E^3$, making them bind the wood of the side bars, and tends also, at the same time, if the bolt-holes in the lugs and side bars are large, for the bolts to tip the bolts slightly, thereby seating the angle of the bolt snugly at the corner of the bolt-hole in the side bar. In short, the tendency of this thickening of the lug is to raise the angle-seat of the leg onto the corner of the side bar to which it is applied. It will be noticed that the use of the angle-bolt, together with the angle-seat of the leg, tends to bind the leg to the side bar much more rigidly than it could be done by two bolts at right angles to each other corresponding to the two arms of the one angular bolt.

The presence of the lugs $E'$ and $E^2$ below the side bar interferes with inserting at that point a bolt to secure the strap F, and that strap is therefore most conveniently secured by having its ends bent down outside the side bar and penetrated by the horizontal branch of the angle-bolt, and by lapping it outside the lug $E^3$ of the leg it dispenses with a washer at that point.

I claim—

1. In a hand-truck in combination with the body and the wheels; a shoe or lift at the forward end pivotally connected to the body and adapted to oscillate between two positions, at one end of which it forms a forwardly-extended base adapted to support the truck standing upright, while at the other limit it projects at an obtuse angle to the body and provided with stops to arrest it at said positions respectively, whereby it is adapted to lie flat on the floor when the base extends obliquely rearward to afford leverage for lifting and held by downward pressure on the handles, substantially as set forth.

2. In a hand-truck in combination with the body having the axle at the rear; the wheels journaled on such axle, and the shoe or lift pivoted thereat and extending forward from its pivot and adapted to oscillate between the position substantially at right angles to the length of the body; and a position at an angle materially greater than right angles and provided with stops to arrest it at said positions respectively, substantially as and for the purpose set forth.

3. In a hand-truck in combination with the body comprising side bars and a cross-sill which joins them at the lower forward end; the axle located at the rear and higher than said forward cross-sill; a shoe or lift pivoted at the axle and extending forwardly therefrom above the cross-sill and adapted to stop on the latter, and provided with a further stop on the body above the cross-sill; substantially as set forth.

4. In a hand-truck in combination with the frame comprising side bars and cross-sills uniting rigidly; brackets which terminate the side bars respectively and which extend rearward to afford supports for the axles; a shoe or lip comprising a forward lip and arms extending rearward therefrom when the ends and the axle constituting the fourth side are parallel with the lip; said frame being adapted to have its said side arms inserted between the side bars, and to be made rigid with the axle; the latter being journaled in the brackets; suitable stops to raise the side arms at the limits of oscillation about the axis of the axle sufficient to permit the truck to tilt from an upward position to a position inclined obliquely rearward; substantially as set forth.

5. In a hand-truck in combination with the body; the wheels journaled at the rear and provided with interior toothed rims; dogs mounted on the body adjacent to the wheels respectively; and adapted to engage their toothed rims to lock them against rearward rotation; a shoe or lift pivotally connected to the body and adapted to oscillate from a position extending forward substantially at right angles to the body, to a position extending forward at a largely obtuse angle to the body; and suitable means for engaging the dogs with the toothed rims and for disengaging them at will; substantially as set forth.

6. In a hand-truck in combination with the side bars, the brackets which terminate them respectively; the wheels having their axles supported in said brackets and having interior toothed rims; the dogs pivoted in the brackets and adapted to engage the toothed rims; said dogs having each slot $K^{20}$ extending past the fulcrum and the rod L mounted and adapted to slide on each side bar, and having a finger which engages the slot, whereby the dog may be thrown into and out of engagement with the toothed rim, by sliding the rod; and the ends of the slot stop the rod in its sliding movements; substantially as set forth.

7. In combination substantially as set forth, the truck-body; the wheels journaled therein have the toothed rims; the dogs fulcrumed on the side bars of the frame respectively and adapted to engage the toothed rims; said dogs having the slots $K^{20}$ and the rods L provided with slide-bearings on the side bars and extending beyond such bearings to engage the slots in the dogs respectively; whereby said rods serve as springs to hold the dogs in engagement by virtue of the flexure to which the rods are subjected below their lowest bearing on the side bars when in position to hold the dogs engaged.

8. In a hand-truck in combination with the side bars; the legs having sockets which face each other to receive the ends of the cross-sill and having an angle-seat facing inward and upward above said sockets and cross-sill, adapted to be inserted endwise in the sockets; and the truck-frame having side bars adapted to lodge in the angle-seats and the angle-bolts having horizontal arms inserted through the side bars; the upper and lower webs of the sockets and the cross-sill which enters the sockets being virtually prepared to receive the vertical arms of the angle-bolts and the vertical web of the angle-seat being engaged to receive the horizontal arms of said bolts by pins, substantially as set forth, with the nuts on both ends of the bolts.

9. In a hand-truck in combination with the side bars A A; legs E E having lugs E' E² defining sockets and vertical lugs coöperating therewith to define inwardly and upwardly facing angle-seats for the side bars; and the cross-sill D having its ends inserted in said sockets; the cross-strap F' secured to the cross-sill and extending over the side bars and bent down outside the same angle-bolt M M; said side bars and the downbent ends of the straps; the lugs of the sockets and the cross-sill insert therein being all apertured for the angle-bolts; the vertical lugs of the legs being notched at the upper end to receive the angle-bolts and being inserted between the side bars and the downbent ends of the strap and the nuts on the ends of said angle-bolts respectively; substantially as set forth.

10. In a hand-truck the shoe or lift having its forward lip slipping from the forward edge up to a rearwardly-facing shoulder which extends the whole length of the lip parallel; substantially as and for the purpose set forth.

In testimony whereof I have hereunto set my hand, in the presence of two witnesses, at Chicago, Illinois, this 8th day of November, 1895.

HENRY O. THOMAS.

Witnesses:
CHAS. S. BURTON,
JEAN ELLIOTT.